July 25, 1939.  C. S. HAZARD  2,167,151
AUTOMATIC SIGNAL FOR DISPENSING PUMPS
Filed Aug. 21, 1936  3 Sheets-Sheet 1
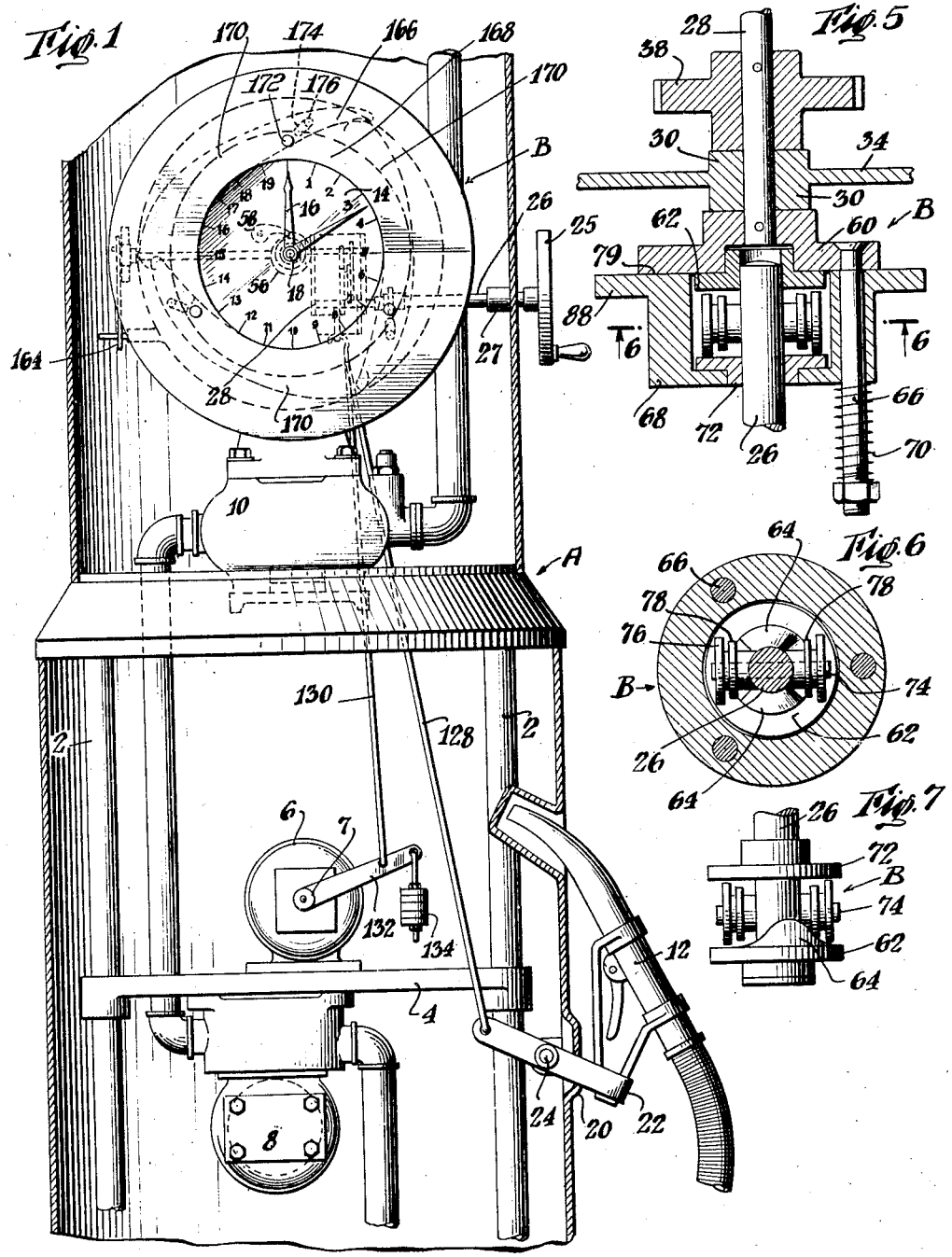
INVENTOR
Charles S. Hazard
BY
ATTORNEYS July 25, 1939.  C. S. HAZARD  2,167,151
AUTOMATIC SIGNAL FOR DISPENSING PUMPS
Filed Aug. 21, 1936  3 Sheets-Sheet 2
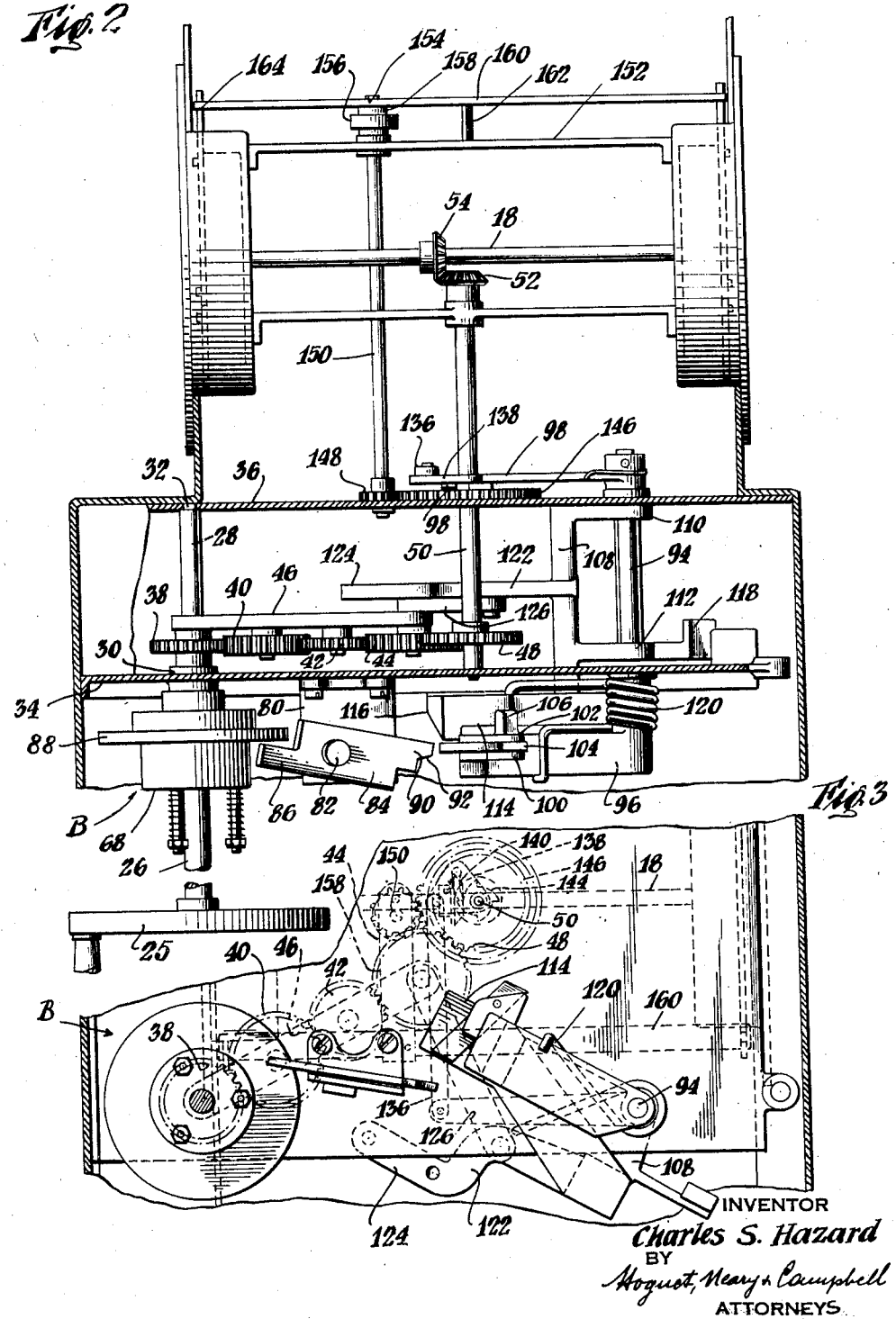
INVENTOR
Charles S. Hazard
BY
Hoguet, Neary & Campbell
ATTORNEYS July 25, 1939.  C. S. HAZARD  2,167,151
AUTOMATIC SIGNAL FOR DISPENSING PUMPS
Filed Aug. 21, 1936  3 Sheets-Sheet 3
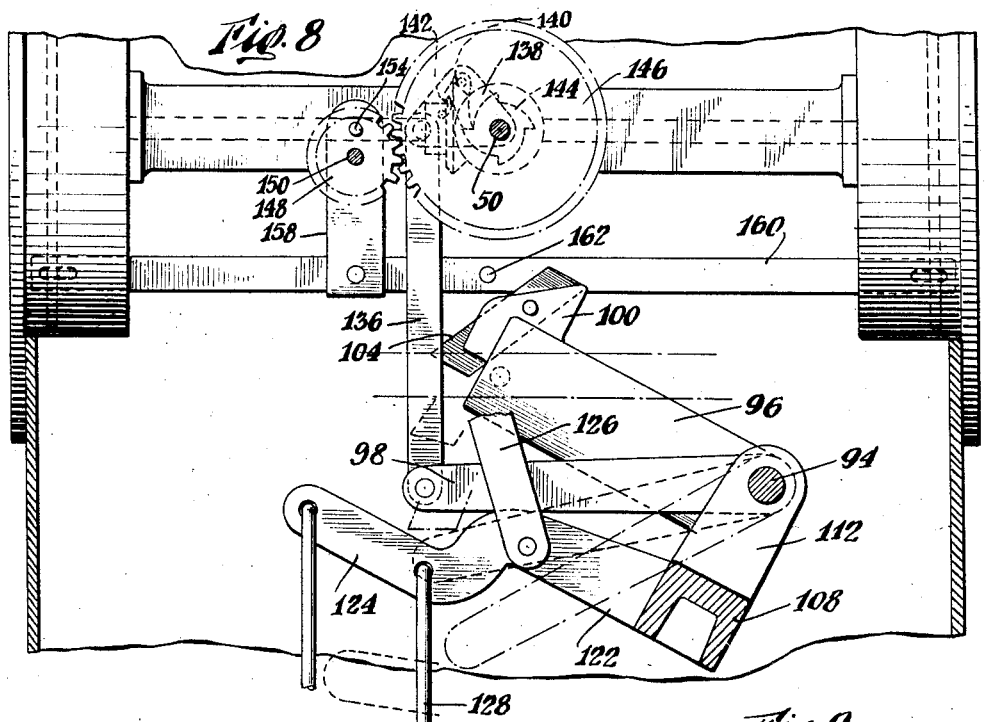
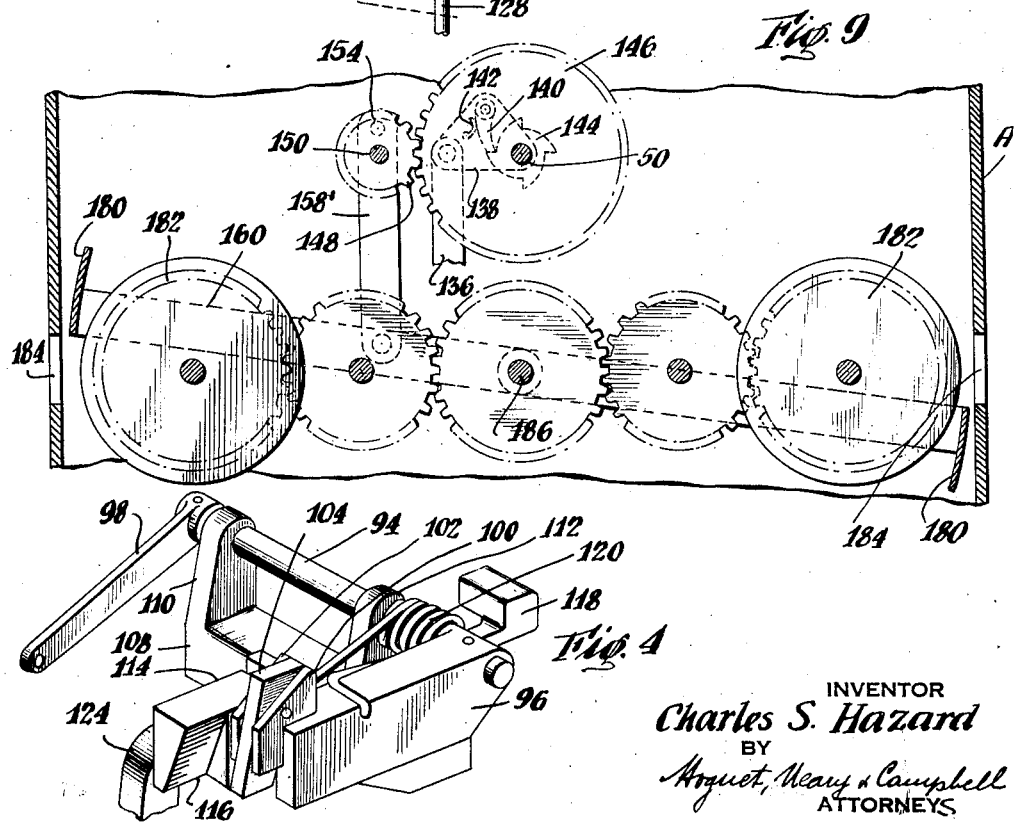
INVENTOR
Charles S. Hazard
BY
ATTORNEYS Patented July 25, 1939

2,167,151

UNITED STATES PATENT OFFICE 2,167,151

AUTOMATIC SIGNAL FOR DISPENSING PUMPS

Charles S. Hazard, New York, N. Y., assignor to Neptune Meter Company, a corporation of New Jersey Application August 21, 1936, Serial No. 97,133

5 Claims. (Cl. 221—95)

This invention is directed to warning devices for informing customers when an indicator, such as that commonly used on a liquid dispensing pump, has not been reset to zero position at the beginning of an operation.

Dispensing devices of the type used in gasoline filling stations, generally include a pump which forces liquid through a meter by which the volume of liquid dispensed is measured. A visible indicator is provided for indicating to the customer and to the attendant the amount of liquid dispensed. However, in order for the indicator to register the quantity of liquid dispensed during each individual transaction, it is necessary to reset the indicator to zero prior to each transaction.

An object of the present invention is to provide a novel indicating device which must be reset to zero position before each transaction in order to obtain a reading therefrom.

A further object of the invention is to warn the customer and the attendant in the event an operation is commenced prior to the resetting of an indicator to zero.

Another object of the invention is to provide a liquid dispensing pump with means which prevent the operator from ascertaining the quantity of liquid dispensed, unless the indicator has been properly zeroized prior to the dispensing operation, thereby preventing the operator from manipulating the pump to give an erroneous reading by totalizing a registered quantity of liquid from a preceding dispensing operation with a subsequently dispensed quantity.

To achieve these objects of the invention, means may be provided for covering the visible indicating portion of the register or a sufficient part thereof to prevent reading of the indicator when the register has not been reset to zero, while allowing the indicator to be fully visible when the device is operated after proper resetting of the indicator.

In that form of the invention hereinafter described, the indicator covering means is movable into a position in front of the visible indicating means of a liquid dispensing pump when the dispensing operation is begun and is held in this position if the indicator were not previously reset to zero. However, if the indicator were fully reset prior to starting a dispensing operation, the indicator covering means will move into its covering position and back again to expose the indicator.

The shutter used in the present invention may be of any desired type, such as a reciprocating or oscillating plate, or an iris type shutter, and may be used with equal facility with a multiple drum or multiple disk register or a dial and pointer indicator, or any combination of the same.

The resetting means employed may also be of any desired type and may be manually operated or motor driven to reset the indicator to zero. As hereinafter described, the mechanism may embody certain features disclosed in applicant's copending applications Serial No. 28,036, filed June 24, 1935, now Patent No. 2,148,122, and Serial No. 69,059, filed March 16, 1936 and issued as Patent No. 2,061,538, now Reissue Patent No. 21,041, and may include suitable shutter operating means controlled by the resetting means to prevent reading of the indicator if liquid is dispensed prior to resetting of the indicator to zero.

For a better understanding of the invention reference may be had to the accompanying drawings in which:

Figure 1 is an elevation of a dispensing device embodying the present invention with a portion of the housing removed;

Figure 2 is a plan view partially broken away of a detail of suitable resetting mechanism for the indicator and the interlocking controls for the shutter of the construction of Figure 1;

Figure 3 is a view in elevation of the resetting mechanism for the indicator and the interlocking controls for the shutter of Figures 1 and 2, also partially broken away;

Figure 4 is a perspective view of a detail of the latch lever and the cam lever for controlling operation of the shutter of Figure 1;

Figure 5 is a sectional view of a lost motion connection between the resetting crank shaft and the shaft for resetting the indicator of Figure 1;

Figure 6 is a sectional view of the lost motion connection taken on line 6—6 of Figure 5;

Figure 7 is a view in elevation of the lost motion connection of Figures 5 and 6 with the housing removed;

Figure 8 is a view in elevation of a detail of the shutter actuating means of Figure 1 with the latch lever shown diagrammatically in three positions; and Figure 9 is a view in section of a modified shutter as applied to a drum type register, with the register shown diagrammatically.

Illustrative of one embodiment of the invention, Figure 1 discloses a dispensing pump having a housing indicated generally as A in Figure 1 enclosing uprights 2 for supporting various elements of the device. A cross member 4 within the housing carries a motor 6 controlled by a switch 7 and operable to drive a pump 8 to force liquid through a meter 10 from a source of supply (not shown) to the usual dispensing hose and nozzle 12.

The meter is actuated by the passage of liquid therethrough to drive an indicator B which is adapted to be reset to restore the indicator to zero between successive dispensing operations. The indicator may be of any suitable type, but as shown comprises a dial 14 and a pointer 16 mounted on a shaft 18. It will be understood that any conventional type of gearing or driving connection may be provided between the meter 10 and the shaft 18 and that either one or two pointers driven from shaft 18 may be provided for indicating the number of gallons and/or the fractions of gallons of fluid dispensed, these elements forming no part of the present invention. For purposes of illustration, however, there is disclosed one indicator pointer 16 only. A friction clutch or other suitable means (not shown) may be provided between the indicator and the meter 10 to permit resetting of the indicator pointer and rotation of shaft 18 to restore the pointer to zero position without necessitating the backward operation of the meter, or rotation of the gears between the meter and the indicator.

In order to reset the indicator 16 to zero position on the dial 14 after a dispensing operation has been completed, suitable resetting mechanism may be used including a hand crank 25 for rotating shaft 26 journalled in bearing 27 in the housing A. In alignment with the shaft 26 is another shaft 28 journalled in bearings 30 and 32 in journal plates 34 and 36 respectively, supported in any desired manner in the housing. Fixed to shaft 28 for rotation therewith is a pinion 38 (Figures 2, 3 and 5) meshing with gear 40 to turn gears 42 and 44 upon rotation of shaft 28. Gears 40, 42 and 44 comprise a swinging gear train supported for movement on lever 46 which is loosely mounted on shaft 28 for free movement thereabout. The end gear 44 of this train of gears when moved upwardly to reset the indicator engages and rotates pinion 48 fixed to shaft 50 journalled in bearings in journal plates 34 and 36 (as shown in Figure 2). At the outer end of shaft 50 is a bevel gear 52 for rotating a similar bevel gear 54 which in turn is fixed to and rotates shaft 18. Since the pointer 16 is fixed to shaft 18 the mechanism described when actuated serves to reset the pointer to zero. The shaft 18 carries a single tooth ratchet 56, which upon rotation in a counterclockwise direction toward zero position is engageable with a pawl 58 mounted on the housing A or the back of the indicator dial 14 to stop the indicator pointer 16 at zero position on the dial.

In resetting the indicator by operation of the mechanism described, the gear 44 is moved into engagement with pinion 48 so that rotation of the crank 25 will cause rotation of shaft 28 to drive shaft 50 and shaft 18 to return the pointer 16 in a counterclockwise direction to zero position. On reaching zero the pawl 58 engages the tooth of ratchet 56 and prevents further rotation of the shafts 18, 50 and 28.

Shaft 26 which drives shaft 28 in resetting the indicator may be releasably connected to shaft 28 so that upon completion of the resetting movement of the indicator the crank 25 may be rotated further to actuate other elements of the mechanism including the shutter control means. For this purpose shafts 26 and 28 are relatively movable through the mechanism disclosed in Figures 5, 6 and 7. As shown in Figure 5, a recessed disk 60 is fixed to shaft 28 for rotation therewith and is provided with a cam member 62, having diametrically spaced cam lobes 64. Attached to the recessed disk 62 by stud bolts 66 is a housing member 68 which is shiftable away from the disk 60 against the action of springs 70. Supported rigidly in the housing 68 is a bearing plate 72, through which shaft 26 projects. The end of shaft 26 is provided with a pin 74 carrying two pairs of independently rotatable rollers 76 and 78. Rollers 76 are of greater diameter than rollers 78 and bear against plate 72 while rollers 78 bear against cam member 62. The rollers 78 normally are held between the cam lobes 64 of the cam member by the action of springs 70 so that the face 79 of the housing 68 engages the adjacent face of the member 62 and serves as a clutch member to cause shafts 26 and 28 to rotate together. However, after the indicator pointer 16 has been reset to zero and pawl 58 engages the single toothed ratchet 56, the shaft 28 is held against further rotation so that further rotation of shaft 26 causes rollers 78 to ride up on the lobes 64 of the cam member. Rollers 76 engaging plate 72 then displace the housing 68 axially of the shaft 26 against the action of spring 70 separating the clutch face 79 of the housing from the adjacent face of the member 60, thereby permitting relative rotation of the shafts 26 and 28.

In accordance with the present invention, displacement of the housing 68 is used to control the operation of the indicator shutter to prevent the operator from reading the indicator in the event liquid is dispensed prior to resetting of the indicator to zero. The shutter mechanism of Figure 1 comprises a ring 168 fixedly secured to the housing and a rotatable ring 166 mounted for movement about the periphery of ring 168. The leaves 170 of the iris shutter are pivoted on the pins 172 on fixed ring 168 and are provided with slots 174 into which pins 176 on the movable ring 166 extend as in the usual construction of an iris shutter. Rotation of the movable ring 166 in a counterclockwise direction as seen in Figure 1 therefore causes the leaves of the iris shutter to move inwardly over the face of the indicator dial, whereas rotation of the ring in a clockwise direction causes them to move toward the periphery of the indicator dial to expose the indicator to view.

The operation of the shutter is controlled by means actuated upon movement of the housing 68 of the resetting mechanism. In the construction illustrated, the control means includes a bracket 80 (Figure 2) supported on the journal plate 34 and provided with a pivot pin 82 about which a control plate 84 is movable. The control plate has a projection 86 extending therefrom and lying adjacent a flange 88 on the housing 68 whereby the control plate is rocked in a counterclockwise direction as seen in Figure 2, on displacement of the housing 68 away from the member 60. The opposite end of the control plate 84 is provided with a projection 90 which normally lies in the path of movement of a latch member 104 pivotally supported between spaced members 100 and 102 on the free end of a latch carrying arm 96. The arm 96 is secured to one end of a shaft 94 rotatably mounted on the journal plates 34 and 36, whereas the opposite end of the arm is provided with a shutter operating lever 98. Movement of the shutter operating lever and the shutter are thus controlled by movement of the latch carrying arm 96.

The shaft 94 to which the latch arm and shutter operating lever are secured is provided with a yoke 108 pivotally supported thereon and formed with an arm 114 having a cam surface 116 which is movable to engage the end 90 of the control plate 84 for returning the control plate to the position shown in Figure 2 upon the initiation of a dispensing operation. A spring 120 surrounding the shaft 94 is provided with one end bearing against the latch carrying arm 96 and with its opposite end engaging beneath the arm 114 to yieldingly hold these arms together, a stop 102 on the arm 96 engaging the upper surface of arm 114 to limit upward movement of the arm 114.

The yoke 108 also is provided with an arm 122 which is connected by a link 126 to the plate 46 for moving gear 44 of the resetting gear train into and out of engagement with the gear 48 for resetting the indicator to zero. The arm 122 is also provided with an offset portion 124 connected by the link 128 to a pivoted hose supporting arm 22 which is mounted at 24 within the casing and projects through an opening 20 to receive and hold the nozzle 12 of the dispensing hose. A link 130 also connected to the offset portion 124 of arm 122 extends therefrom to an operating arm 132 for actuating the motor switch 7. The arm 132 is provided with a weight 134 which serves to lower the switch arm 132, moving it to its "on" position for starting the motor upon removal of the hose nozzle from its support 22. The weight of the hose and nozzle on support 22 is sufficient to hold the switch operating arm and weight 134 as well as the yoke 108 and arms 96 and 114 in raised position. However, on removal of the hose nozzle the yoke 108 is lowered by weight 134 actuating the switch 7 and lowering the gear train comprising gears 40, 42 and 44 to their inactive position with gear 44 disengaged from gear 48.

Movement of the yoke 108 downward as described also tends to move the latch carrying arm 96 and the shutter operating arm 98 to the lowermost position indicated in dotted lines on Figure 8 for actuating the shutter operating mechanism to move the shutter into and again out of position to cover the indicator dial. However, if the indicator was not previously reset to zero so that the control plate 84 is not moved away from the position indicated in Figure 2 by movement of the housing 68, the latch member 104 will engage the portion 90 of the control plate 84 holding the latch carrying arm 96 and the shutter operating arm 98 in the mid-position indicated in dotted lines on Figure 8. In this case, the shutter operating means will be actuated only far enough to move the shutter into the indicator concealing position so that the indicator cannot be read.

The shutter operating means which is actuated by the lever 98 comprises a link 135 connected to the free end of lever 98, the opposite end of the link being connected to a pawl carrying member 138 rotatably mounted on shaft 50 and having pawl 140 pivoted thereon. Pawl 140 is biased in a counterclockwise direction by spring 142 and engages four toothed ratchet 144, integral with or rigidly attached to a gear 146 also loosely rotatable on shaft 50. Driven by gear 146 is a pinion, 148, fixed to shaft 150 journalled in plate members 36 and 152. The gears 146 and pinion 148 are so proportioned that one revolution of gear 146 causes four revolutions of pinion 148 and crank pin 154 mounted on disk 156 adjacent plate 152. Crank pin 154 is connected through a link 158 to a shutter actuating lever 160 pivotally mounted on plate 152 at 162, whereby rotation of the crank pin 154 will cause oscillatory movement of arm 160. The ends of shutter actuating arm 160 are connected through a sliding and pivotal connection 164 to the ring 166 which is rotatably mounted on the periphery of a fixed ring 168, so that relative rotation of the outer ring 166 in a counterclockwise direction as viewed in Figure 1 will cause the shutter to close and cover at least partially the dial 14 and pointer 16.

The operation of the device is as follows: Assuming that a dispensing operation has been completed and the dispensing hose has been returned to the movable hose support 22 and that a 10 gallon quantity of fluid has been delivered in the dispensing operation; the indicator will then read 10 gallons, the motor will be stopped and the control member projection 90 will be located under the latch 104 on latch lever 96 with the latter in its highest position as shown in Figures 3 and 8.

To dispense another quantity of fluid, the hose must be removed from the hook 22 permitting it to swing upwardly, thereby closing the switch 7, starting the motor 6 and pump 8. The gear 44 is moved out of engagement with pinion 48 on the shaft 50 by downward movement of yoke 108 and arm 122 and latch carrying arm 96 and cam carrying lever 114 are also moved downwardly. However, latch 104 engages the projection 90 on the control member 84 thus moving only approximately one-half of the distance through which it is capable of moving (see Figure 8). Lever 98 also moves through a corresponding arc and the pawl 140 moved by link 136 engages the ratchet 144, turning gear 146 through one-eighth of a revolution. The ratio between gear 146 and pinion 148 being 1 to 4, pinion 148 is rotated through 180° thereby moving the crank pin 154 into its lowest possible position or 180° from the position disclosed in Figure 8. This displaces lever 160 downwardly, rocking ring 166 counterclockwise and closing the iris shutter so that it is impossible to see the dial 14 and pointer 16. If the valve in the dispensing nozzle is then opened to dispense the fluid, the shutter will remain in indicator covering position preventing the attendant from knowing the quantity of liquid dispensed.

On discovering this condition, the attendant must reset the indicator B to zero by operating the resetting crank 25 with hook 22 in its hose supporting position. The indicator is thus returned counterclockwise to zero position through the rotation of shafts 26 and 28. The indicator shaft 18 and pointer 16 are then rotated counterclockwise until stop means 56 and 58 engage, thereby preventing further rotation of shaft 18. Further rotation of crank 25 causes shaft 26 to rotate relative to shaft 28 displacing the housing 68 axially of shaft 26, and swinging the projection 90 on control member 84 from beneath the latch 104. Thereafter, upon upward movement of the hose support 22, the motor 6 is started, and the gear 44 disengaged from pinion 48 leaving indicator shaft 18 free to be rotated by the meter 10. The latch lever 96 is then swung downwardly with levers 114 and 122 to its lowermost position through the tension of spring 120, as shown in dotted lines in Figure 8. As cam lever 114 moves downwardly, similarly as disclosed in my aforesaid application Serial No. 28,036, cam surface 116 engages an edge of projection 90 on the control member 84 turning the latter clockwise as viewed in Figure 2. The cam surface 92 engages latch 104, tilting it back so that the projection 90 may pass thereabove as the latch moves downwardly. Lever 98, moving with latch lever 96 causes pawl 140 to rotate ratchet 144 and gear 146 through one-fourth of a revolution, thereby turning the pinion 148 and crank pin 143 through 360°, and oscillating shutter actuating arm 160 and shutter actuating ring 166 to close and again open the shutter leaving the dial 14 and pointer 16 exposed. The hand valve on the nozzle may then be opened to dispense the fluid and the quantity of fluid dispensed may be read from the indicator.

A dispensing operation having been completed, replacement of the hose upon the support 20 causes link 128 to force lever 122, 124 upwardly, moving cam lever 114 upwardly against stop lug 106, and moving levers 96 and 98 upwardly in a clockwise direction. The link 130 lifts switch arm 132 to "off" position, thereby stopping the motor 8. As the lever 114 reaches its highest position, the lever 122, 124, acting through link 126, causes the gear 44 to engage the pinion 48 thereby placing the indicator in a condition to be reset to zero.

It will be understood from the foregoing description that a device has been provided which necessitates a positive sequence of operations prior to a dispensing operation to insure that the quantity of liquid dispensed may be indicated visibly on the indicators of the pump in order that the customer and the attendant may determine the quantity that has been dispensed.

In Figure 9 is illustrated a drop type of shutter for use with a drum type of register. The mechanism for actuating the shutters 180 of this indicator may be the same as that in the first described modification; the oscillatable arm 160 in this modification however directly carries the shutter plates 180 which move between the numeral drums 182 and the usual apertures 184 in the dispensing pump housing A. The shutter carrying arm 160 may be suitably supported for movement on the main drive shaft 186 of the register and may be connected directly to the crank pin carrying pinion 148 of the construction of Figure 1 by the link 158'. The operation of the shutters in the modified construction is the same as that described for the operation of the construction of Figure 1 and therefore will be apparent from the foregoing description.

It will be understood from the foregoing description that the shutter actuating mechanism and the shutters are easily adapted for use with any type of register or indicator, or with any combination of one or more registers of the same or different type, and that many modifications of the mechanism for actuating the shutter may be made. Therefore, the examples disclosed should be considered as illustrative only, and not as limiting the scope of the invention.

I claim:

1. In a liquid dispensing device having a meter, an indicator actuated in accordance with the operation of said meter and movable away from an initial position in proportion to the quantity of liquid dispensed and means for resetting said indicator to said initial position: the combination of an iris shutter having a plurality of movable shutter leaves disposed in front of the indicator, movable means for selectively moving said shutter leaves to indicator covering and indicator exposing positions and control means actuated by said resetting means for limiting movement of said shutter moving means to a position wherein the shutter leaves cover the indicator until the indicator has been reset to initial position.

2. In a liquid dispensing device having a meter, an indicator movable away from an initial position in accordance with the operation of said meter, and means for resetting said indicator to said initial position; the combinaton of shutter means movable to indicator covering and exposing positions, a control member engageable with said shutter means to stop the shutter means in indicator covering position, said control member being displaceable after the indicator has been reset to said initial position to allow the shutter means to move to indicator exposing position.

3. In a liquid dispensing device having a meter, an indicator movable away from an initial position in accordance with the operation of said meter, and means for resetting said indicator to said initial position; the combination of shutter means movable to indicator covering and exposing positions, means for initiating the movement of said shutter means, and a control member engageable with said shutter means to stop it in indicator covering position, said control member being displaceable by said resetting means after the indicator has been reset to said initial position to allow said shutter means to move to indicator exposing position.

4. In a dispensing device having means for dispensing fluid, means for starting said dispensing means, an indicator for registering the quantity of fluid dispensed, and means for resetting the indicator to an initial position; the combination of a shutter movable to indicator covering and exposing positions, means operatively connected to said starting means for normally moving said shutter first to indicator covering and then exposing positions when said starting means is actuated to start said dispensing means, and a control member associated with said resetting means and operative to stop said shutter in indicator covering position when the indicator is away from said initial position.

5. In a dispensing device having means for dispensing fluid, means for starting said dispensing means, an indicator for registering the quantity of fluid dispensed, and means for resetting the indicator to an initial position; the combination of a shutter movable to indicator covering and exposing positions, means operatively connected to said starting means for normally moving said shutter first to indicator covering and then exposing positions when said starting means is actuated to start said dispensing means, and a control member associated with said resetting means and operative to stop said shutter in indicator covering position when said indicator has not been reset to initial position, said control member being displaceable by said resetting means after the indicator has been reset to said initial position.

CHARLES S. HAZARD.